April 30, 1968  E. O. DU BUIS ETAL  3,380,416
THREAD CUTTING DEVICE
Filed May 18, 1966  7 Sheets-Sheet 1
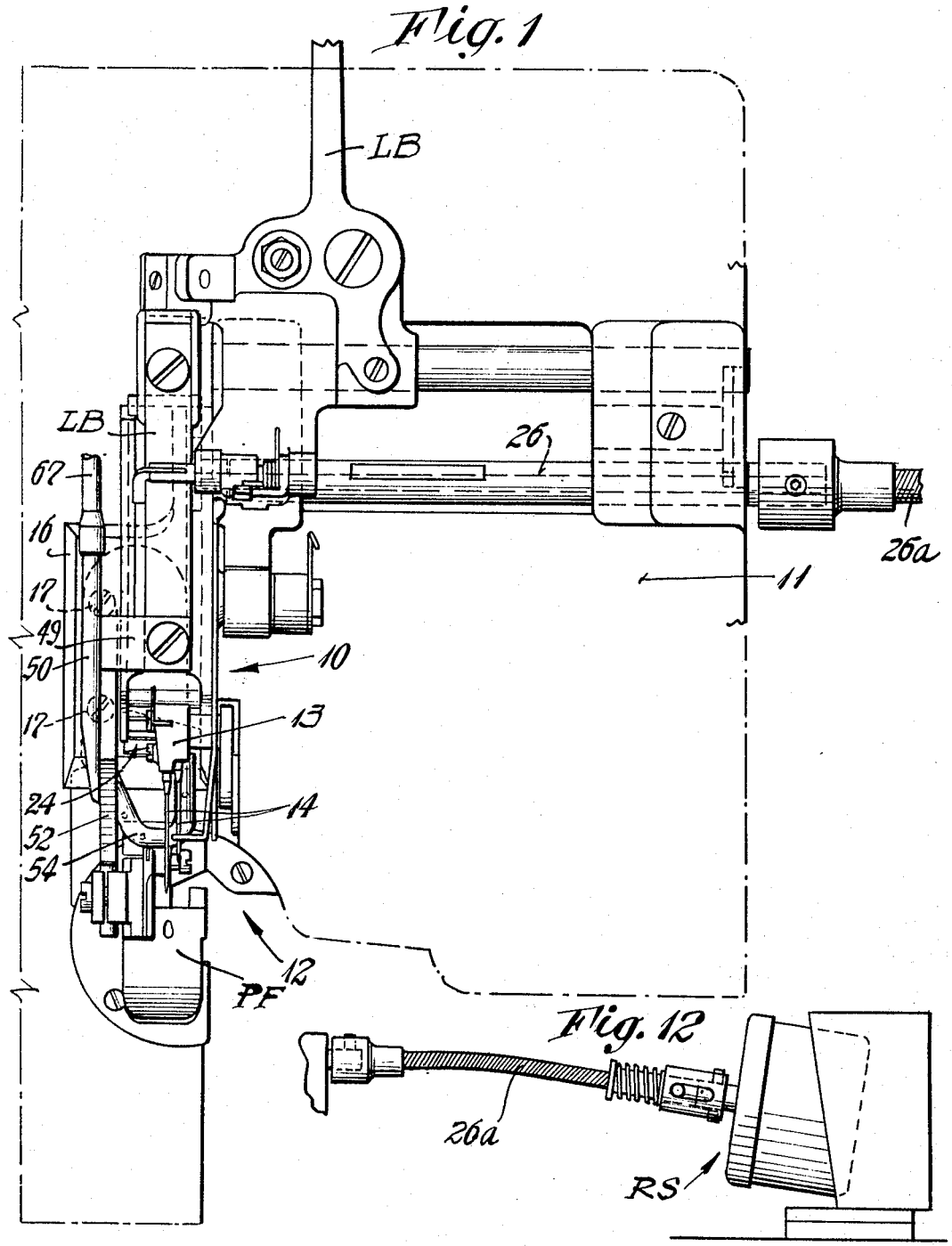
INVENTORS
Edwin O. DuBuis
Edward L. Cucksey
BY
Johnson and Kline
ATTORNEYS

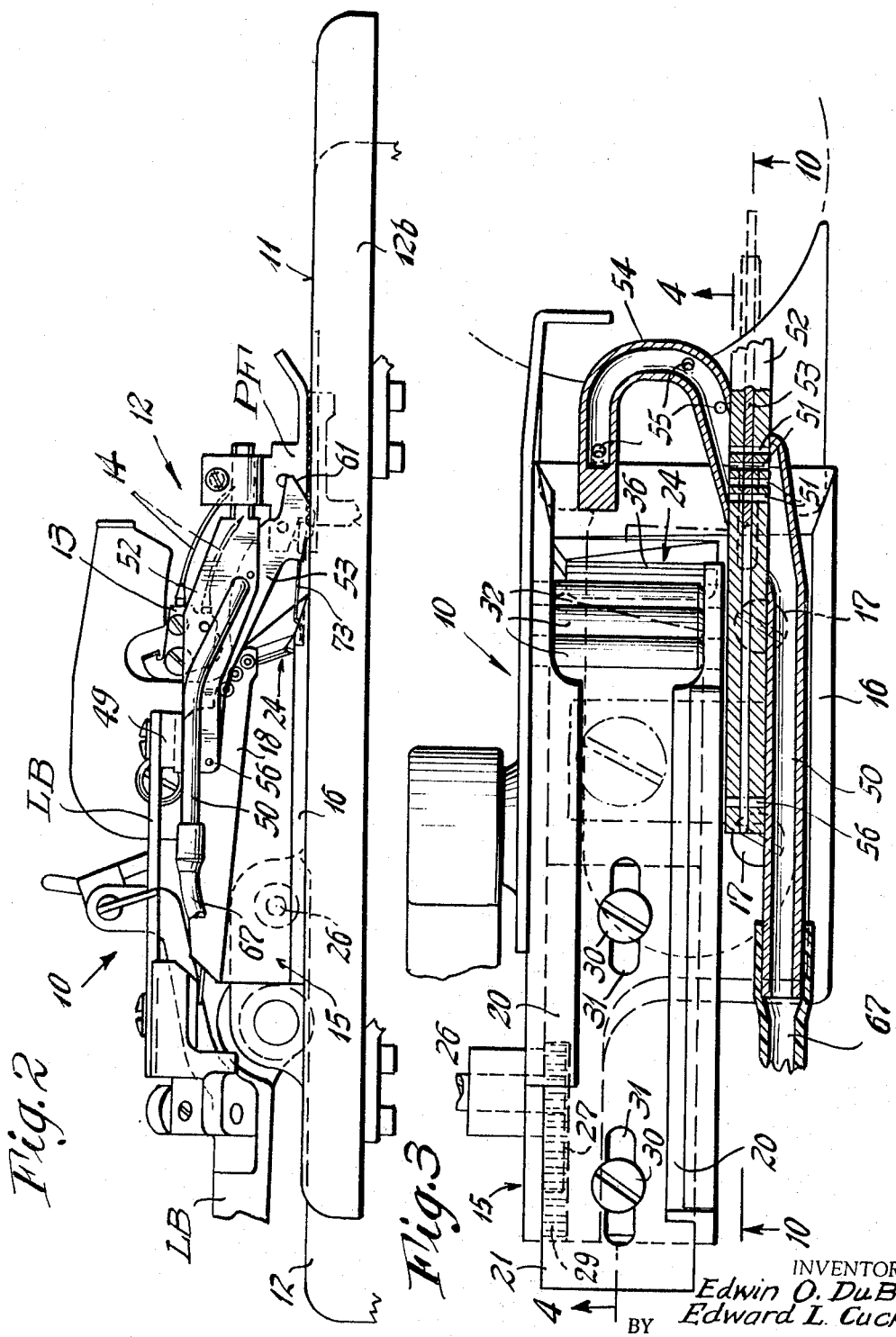

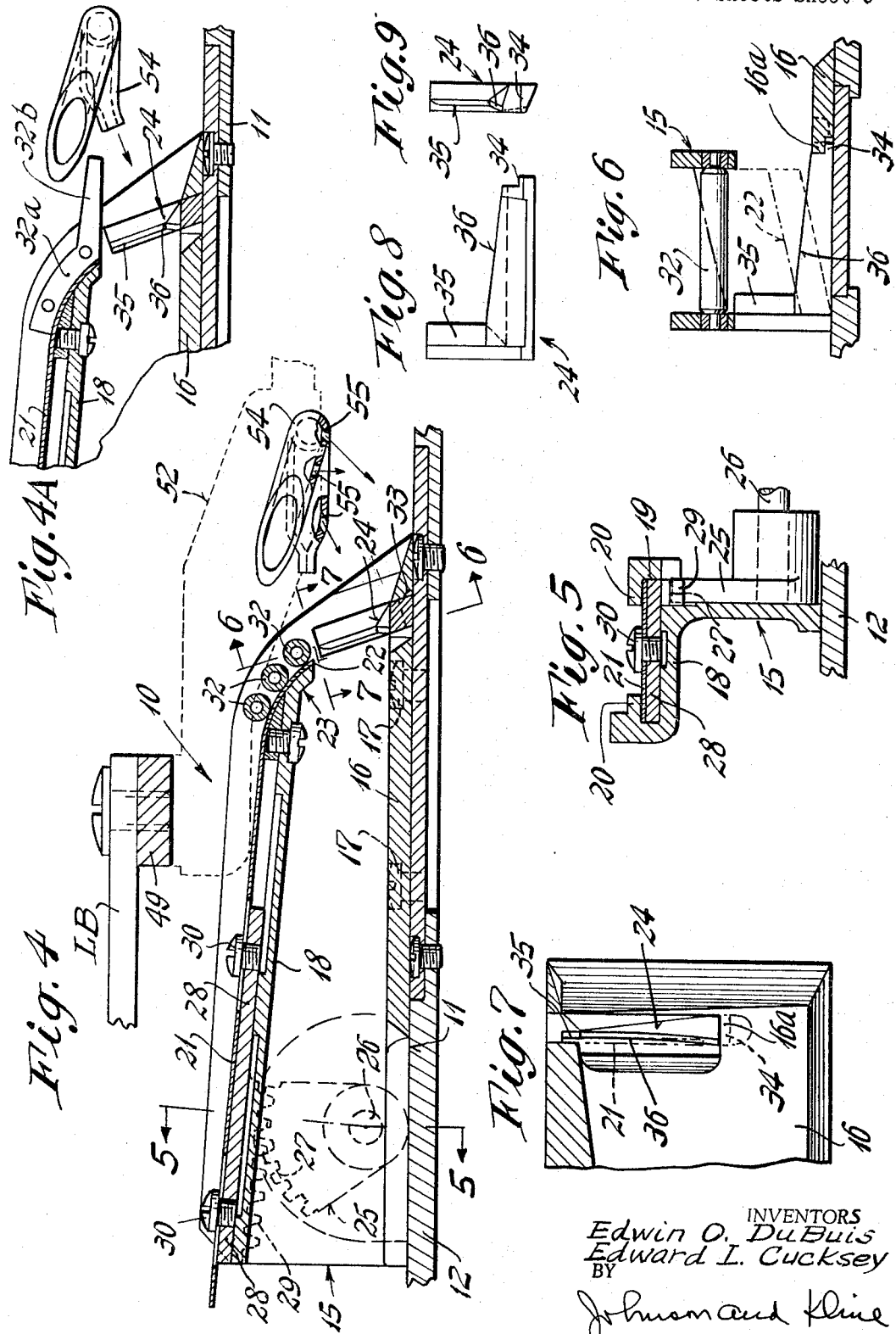

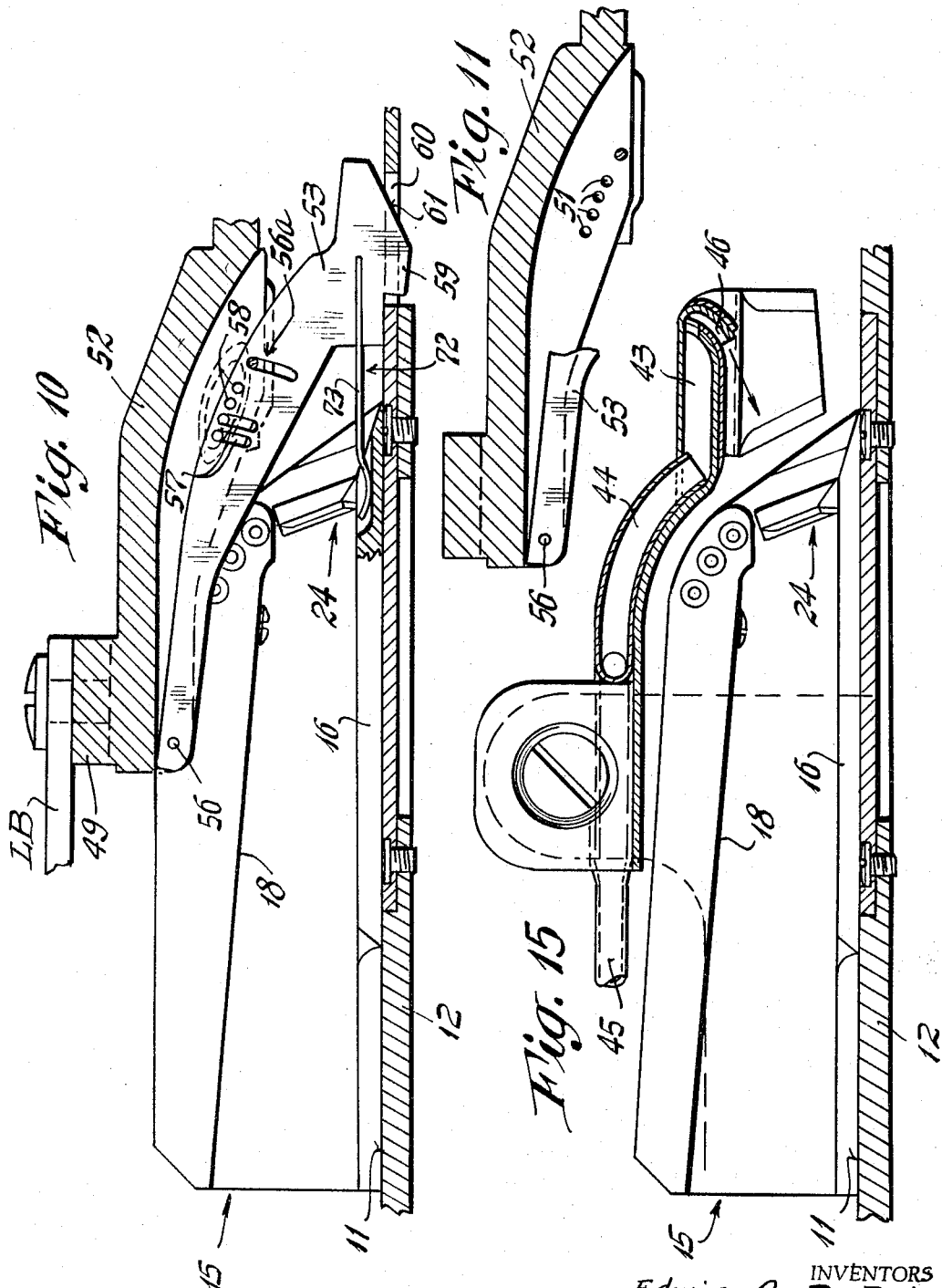

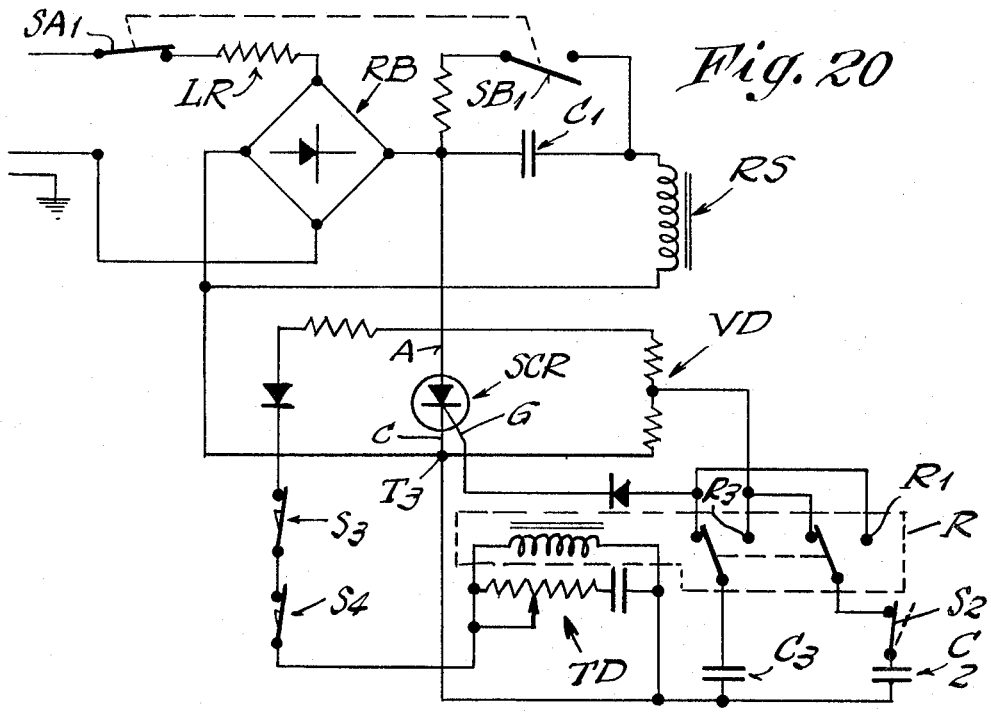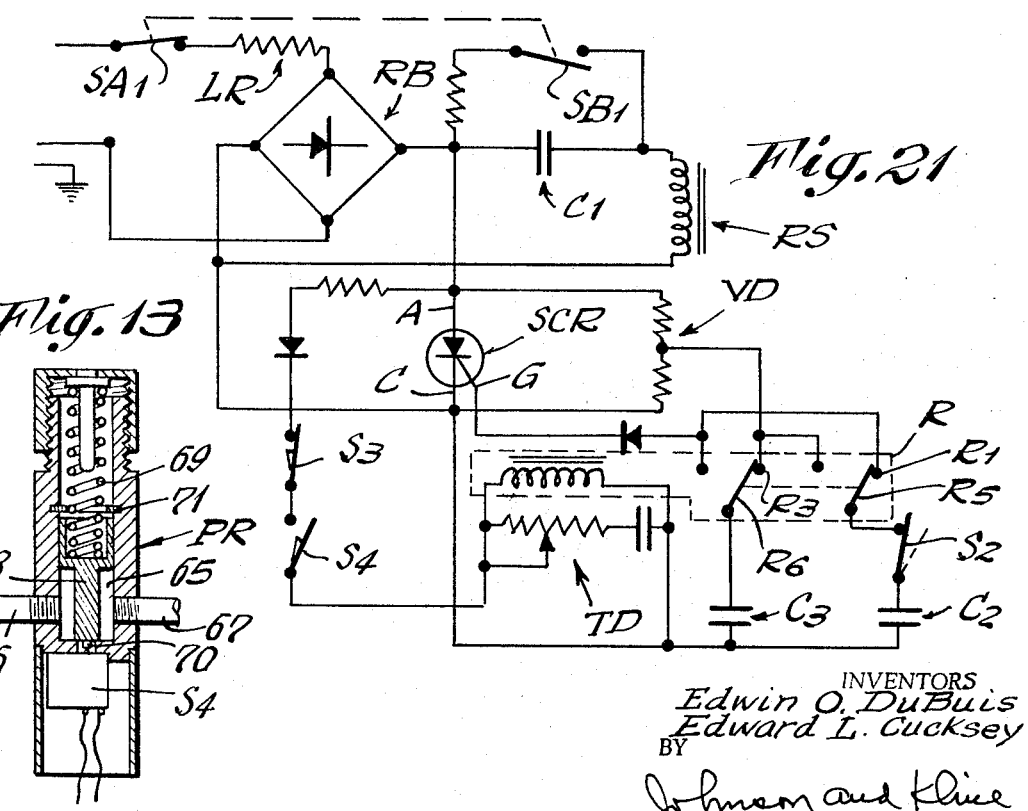

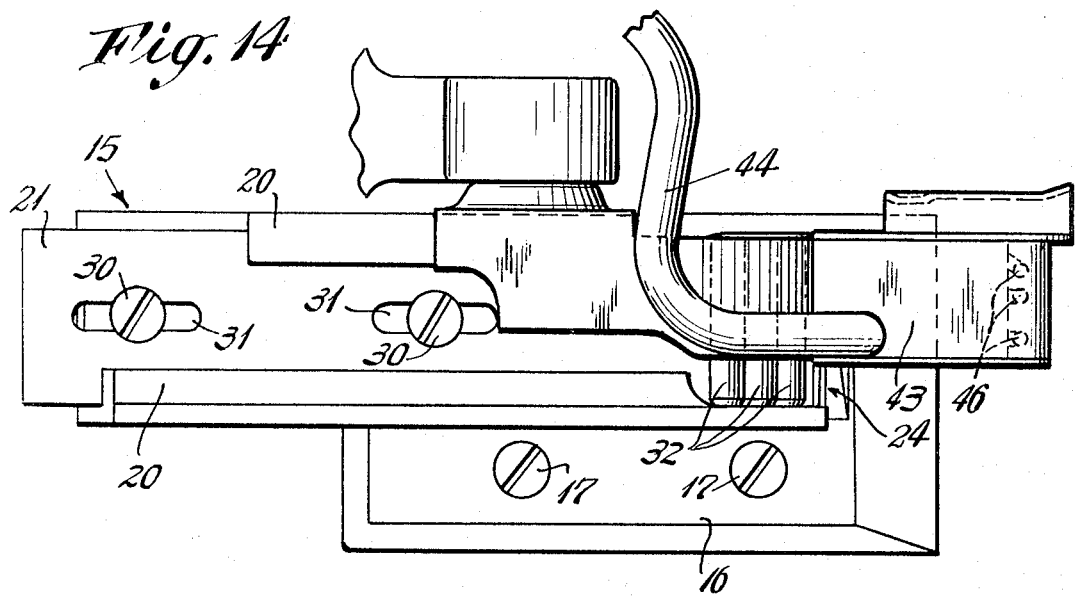
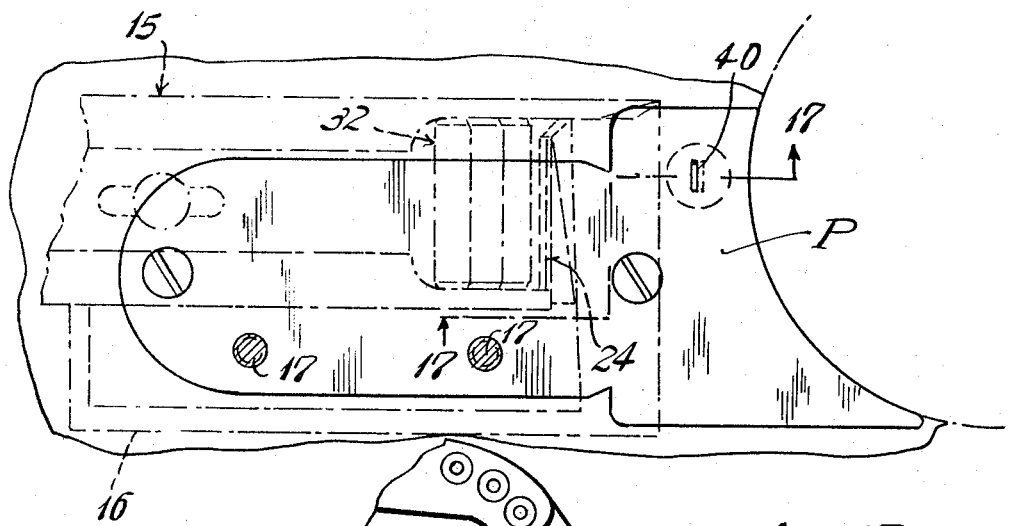
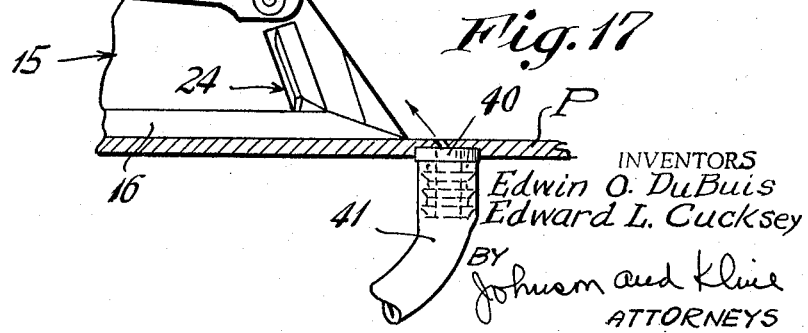

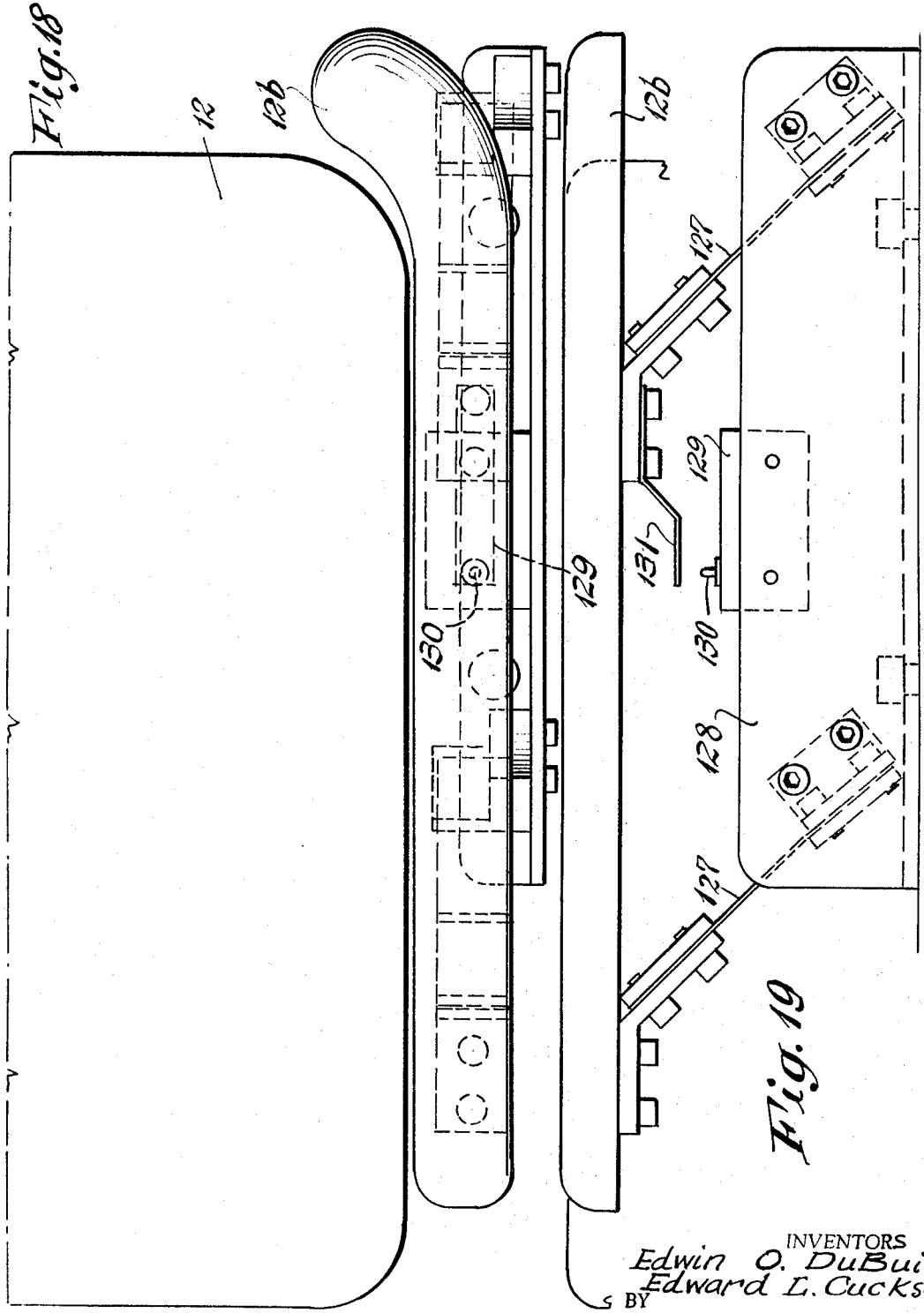

United States Patent Office 3,380,416
Patented Apr. 30, 1968

3,380,416
THREAD CUTTING DEVICE
Edwin O. Du Buis, Pearl River, and Edward L. Cucksey, Upper Nyack, N.Y., assignors to Willcox & Gibbs Sewing Machine Company, New York, N.Y., a corporation of New York
Filed May 18, 1966, Ser. No. 551,011
13 Claims. (Cl. 112—252)

ABSTRACT OF THE DISCLOSURE

A thread cutter having a movable blade which is actuated to produce a cutting operation on a thread chain in response to a pulse of energy from a capacitor under control of a control means sensitive to the detection of the presence or absence of a fabric in sewing position.

---

Heretofore cutting devices have been provided for cutting chain stitches or the like, but these have been costly to maintain and not too efficient in operation.

It is an object of the present invention to provide a cutting device which is simple in construction, has a novel cutting blade construction which can be readily replaced or removed for sharpening, can be operated manually or by automatic means, and can be provided with an effective control for the thread to be cut by which it is directed into proper cutting relation.

This is accomplished by using a novel flexible flat cutter blade and having reciprocating means therefor for moving it so that it flexes transversely and into cooperating relation with a fixed blade to shear a chain stitch disposed therebetween. The reciprocating means for the blade can be manually actuated or controlled by the presence of fabric in sewing position in the machine.

A feature of the invention resides in the novel blade construction which can be made economically and can be readily and easily serviced.

A further feature of the invention resides in the novel use in the combination of an air stream, in conjunction with the cutting device, for directing the chain stitch into proper position, which air stream can be continuous and/or controlled by the detection of the presence of a fabric in sewing position.

In the preferred form of the invention the actuation of the device is automatic and under control of a fabric detector, which when actuated by a fabric in sewing position, will cause a back pressure in the air line which will operate a pressure-responsive switch in the novel control circuit. This will control the actuation of the rotary solenoid for operating the knife to sever the chain after and/or or before the sewing operation.

Other features and advantages of the invention will be apparent from the specification and claims when considered in connection with the acompanying drawings in which:

FIGURE 1 shows a top view of the sewing machine showing the cutter located in back of the sewing position.

FIG. 2 is a side view looking from the left in FIG. 1.

FIG. 3 is an enlarged top view of the cutter partly in section.

FIG. 4 is a sectional view taken along lines 4—4 of FIG. 3.

FIG. 4A is a partial view similar to FIG. 4 showing another form of the invention.

FIG. 5 is a sectional view taken along lines 5—5 of FIG. 4.

FIG. 6 is a sectional view taken along lines 6—6 of FIG. 4.

FIG. 7 is a sectional view taken along lines 7—7 of FIG. 4.

FIG. 8 is a front view of the stationary cutter element.

FIG. 9 is an end view taken from the right of FIG. 8.

FIG. 10 is a sectional view taken along lines 10—10 of FIG. 3 with no fabric in sewing position.

FIG. 11 is a partial view similar to FIG. 10 with the fabric detection lever broken away.

FIG. 12 is a view of the rotary solenoid and the connection to the cutter.

FIG. 13 is a sectional view of the pressure operated control switch.

FIG. 14 is a top view of another form of the invention.

FIG. 15 is a side view, partially in section of FIG. 14.

FIG. 16 is a view of the sewing machine having a different air supply means.

FIG. 17 is a sectional view taken along line 17—17 of FIG. 16.

FIG. 18 is a plan view of a manual actuator for the cutting device.

FIG. 19 is a side view of FIG. 18.

FIG. 20 shows the circuit for actuating the cutter when no fabric is in sewing position.

FIG. 21 shows the circuit for actuating the cutter when a fabric is in cutting position.

As shown in the drawings, the cutter device 10 of the present invention is mounted on the top surface 11 or table of a sewing machine 12 so as to be disposed behind the stitching means 13 thereof, including needles 14, so as to sever the chain of stitches, produced by the stitching means, either before or after a stitching operation.

The cutting device comprises a body 15 having a base 16 forming a plate mounted on the top surface 11 by screws 17. The body has a laterally extending portion 18 disposed in spaced relation above the base so as to provide a passage through which the sewn material passes. The portion 18 is provided with an upwardly facing open slot or recess 19 having overlying inwardly projecting shoulders 20 for receiving and guiding an elongate thin flexible reciprocating cutting blade 21 slidable in the slot and having at the forward end thereof a cuting edge 22. The slot, which as shown in FIG. 4 is straight and flat, is slightly inclined to the forward end of the body and merges with a downwardly curved portion 23 of the body for flexing the forward end of the blade downwardly from its normal plane, upon forward movement of the blade in the slot, to cause the cutting edge 22 to be moved into cooperative relation with a fixed cutter element 24 on the base to cut the chain of stitches disposed in the passage therefor located between the end of the curved portion carrying the blade and the fixed cutter element.

While the cutter blade 21 may be reciprocated by any suitable means, it is preferred to employ a gear segment 25 mounted on an oscillating shaft 26 with the teeth 27 of the gear forming the driving means for the blade. Although the blade can have apertures therein to cooperate with the teeth to form the driving connection with the teeth of the gear, it is preferred to provide a rigid slide 28 having a toothed rack 29 formed thereon to cooperate with the gear and to have the thin cutting blade 21 secured to the slide for movement therewith by a pair of screws 30. The screws 30 are disposed in elongate apertures 31 in the blade as shown in FIG. 3 to enable accurate location and adjustment of the blade on the slide. This provides a rugged drive for the blade and permits a thinner and more flexible blade to be used. Also, this construction provides for ready installation and removal of the blade for sharpening and/or replacement and for accurate adjustments of the position of the blade.

The blade is normally held in retracted position by suitable means with its forward end slightly flexed downwardly as shown in the form of the invention illustrated in FIG. 4 wherein it is in engagement with a plurality of rotatable transverse guide rollers 32 which are mounted in the body and engage the top broad surface of the blade and guide and hold it against the curved bottom 23 of the forward end of the slot to cause the blade to flex downwardly and move into engagement with the fixed cutting element 24.

In the form of the invention shown in FIG. 4A the guide means comprises a solid shoe 32a of Phosphor bronze or the like fixed to the body for engaging the top broad surface of the blade to guide it into cutting relation with the fixed cutting element 24. If desired, the shoe 32a can have an air deflector portion 32b projecting therefrom for directing the air from a nozzle 54 to guide the chain into cutting relation.

When it is desired to perform a cutting operation, the shaft 26 is actuated to oscillate the gear segment and move the blade from the normal retracted position and carry its cutting edge into shearing relation with the fixed cutting element. Although the shaft may be rotated manually, it is at present preferred to provide a power operator therefor which can be actuated manually or automatically in response to a predetermined condition. While the power operator may take many forms, it is herein illustrated as a rotary solenoid RS which is connected to the shaft 26 by a flexible shaft 26a (FIG. 12) and normally biased so that the gear will urge the slide and blade carried thereby to a retracted position as shown in FIG. 4. When the solenoid is energized it will rotate the gear sufficiently to reciprocate the cutting blade to cutting relation with the fixed cutting element and upon deenergization of the solenoid it will return the blade to said normal position.

The solenoid can be controlled manually as shown in FIGS. 18 and 19 by an arm 12b disposed at the end of the base or table 12 of the sewing machine which is mounted by springs 127 carried by bracket 128 disposed below the table so as to be located in the plane of the base or table. The bracket also carries a control switch in the form of a microswitch 129 connected in the circuit for the rotary solenoid RS and having an operator 130 to be engaged by an actuator 131 on the undersurface of the arm, when the arm is moved against the action of the springs and out of normal position as shown in FIG. 19 to initiate the cycle of operation of the solenoid to reciprocate the cutting blade.

In the preferred form of the invention the rotary solenoid RS is automatically energized in accordance with a predetermined condition to cause the shaft 26 to rotate and the gear segment to move the blade carrier and blade 21 forwardly from its retracted position and into cutting relation with the fixed cutting element 24 to sever a chain of stitches disposed in the passage in the device as will be explained.

The fixed cutter element 24, as shown in FIG. 4 and FIGS. 6 to 8, is secured in a recess 33 in the base 16 and has a portion 34 extending under a lip 16a on the base and is provided with a vertical portion 35 which engages the deflected end of the cutter blade and guides it into cooperative relation with the cutting edge on the fixed cutter element. As shown in FIG. 6, the cutting edge 22 on the end of the blade is formed to slope in one direction with respect to the longitudinal axis of the blade and the cutting edge 36 of the fixed cutting element slopes in the direction opposite to the slope of the end of the blade and also as shown in FIG. 7 the fixed blade has a slight curvature on the cutting edge 36 which progressively extends from the guide portion 35 toward the rear so that as the blade 21 moves downwardly the resiliency of the blade will hold its cutting edge 22 in contact with the cutting edge 36 and they will engage in a point shearing action progressively moving across the cutting edges.

In accordance with the present invention means are provided for directing the chain of stitches into proper cutting relation with the cutting device. This means is a stream of air so directed that it will pick up a chain of stitches and move it into a position in which it overlies the cutting edge of the fixed cutter element. This means in its simplest form to be severed upon actuation of the movable cutter can comprise merely a fixed nozzle 40 in the plate P, which nozzle, as shown in FIGS. 16 and 17, is directed rearwardly into the passage in the cutter and is connected by a line 41 to a suitable air source (not shown) so as to direct a stream of air rearwardly to the cutting device. In the form of the invention shown in FIGS. 14 and 15 it can comprise a nozzle 43 overlying the device and connected to a line 44 connected to said air supply by line 45 with the nozzle having apertures 46 directing the flow of air rearwardly to pick up and direct the chain to the cutting device.

However, in the preferred form of the invention as shown in FIGS. 1–4, the means is connected to the lifter bar LB by bracket 49 to move therewith as it shifts the presser foot PF and comprises a tube 50 extending along the side of the device and connected through feeding passages 51 in a housing 52 for a fabric detector element or sensing finger 53 to the nozzle 54 disposed above and in front of the passage in the cutting device. The nozzle 54, as shown in FIGS. 3 and 4, has a plurality of apertures 55 therein directed toward the cutting device so as to pick up the chain and insure its movement into proper cutting relation.

In this form of the invention there is provided a means for automatically actuating the cutter device at predetermined times in the sewing operation and controlled by the fabric detector element or sensing finger 53 for detecting the presence of a garment or other fabric in sewing position. As shown in FIGS. 3 and 10, this detecting element 53 is pivoted at 56 on the housing for limited movement as determined by the pin and slot 56a and projects forwardly of the device and has a pair of elongate apertures 57, and a pair of round apertures 58 each aligned with the passages 51. It has a portion 59 extending from the forward end downward and into a slot 60 located in the sewing position, which portion merges with an upwardly inclined lifting or camming means 61 at the end of the element 53. This finger is normally urged into the position shown in FIG. 10 wherein the apertures 57 and 58 are aligned with the passages. As a fabric is fed into the sewing position, it will engage the inclined forward surface 61 and lift the finger. As the finger lifts, the apertures 58 in the lever are moved and the lever will close off the associated passages 51 and will cause a build-up of pressure in the line supplying air thereto. Disposed in this line is a pressure-sensitive or pressure-responsive switch for automatically controlling the operation of the cutting device. One such switch is shown in FIG. 13 and has a pressure-responsive actuator PR in which the flow of air normally passes through a chamber 65 therein from the inlet 66 to the outlet 67 connected to tube 50 to supply air under pressure thereto. If the passages 51 in the housing are aligned with the apertures 57, 58, the pressure in the line will be normal pressure and a plunger 68 will be held in the position shown in FIG. 13 by the spring 69 and the normally open switch S4 will have its contacts closed by the tip 70 on the plunger 68. However, upon the movement of a fabric into sewing position, the sensing finger will lift and move the apertures 58 out of alignment with the cooperating passages 51 and cause a build-up of back pressure in the line. This back pressure will overcome the spring 69 and lift the plunger into engagement with the stop 71 and allow the switch S4 to return to its normal open position. The actuation of the switch S4 will control a relay R and the operation of the power supply means for actuating the cutting blade to perform a cutting operation as will be explained.

If desired, to insure the movement of the fabric out of sewing position and past the cutting blades before actuation of the cutting device, the finger 53 can have a fabric contacting portion 72, herein illustrated as a spring member 73 secured thereto, which will ride on the material and hold the finger in raised position until the fabric has moved out of contact with the portion 59 and until it is past the cutter blades. At this time the finger will drop and the pressure in the line will return to normal and close the switch S4.

In the preferred form of the invention the rotary solenoid RS is given an actuating pulse capable of moving the cutter blade through a cutting cycle. This is accomplished by the circuit shown in FIGS. 20 and 21 where it will be seen that when the circuit is closed by switch SA1 to the power supply the capacitor C1 will be charged through the rectifier bridge RB and the limiting resistance LR. The capacitor C1, however, cannot supply its charge to operate the rotary solenoid until the control SCR connected thereto is activated. This is activated by a pulse from either capacitor C2 or C3 which, through the relay R controlled by the control switch S4, alternately renders the circuit conductive at the change of condition, i.e., the presence or absence of fabric in the sewing station to render the circuit for the solenoid RS conductive and permit the pulse discharged from the capacitor C1 to energize the solenoid to rotate the shaft as previously described.

FIG. 20 shows the position of the control switch S4 when there is no fabric in the sewing position and shows that the relay R has been moved from normal position wherein movable contacts R5 and R6 engage contacts R1 and R3 to a position wherein capacitor C3 is connected through contact R4 to the gate terminal G of the control SCR so that the pulse therefrom will render the control SCR conductive whereby current will flow through the same from the anode A to cathode C to the terminal T3 and at the same time the capacitor C2 will be connected to contact R3 and will be charged by the voltage divider VD connected across terminals T2 and T3.

When the fabric is placed in sewing position, it will move the sensing finger 53 causing the pressure in the operator PR to build up and move the plunger to cause the control switch S4 to move to its normally open position. This opens the circuit to the relay R which returns to normal position, as shown in FIG. 21, wherein the capacitor C3 is being charged by the voltage divider VD and capacitor C2 is connected to the gate circuit of the control SCR and supplies a pulse to render it conductive to make a front cut. The time interval between the insertion of the fabric and the cut, thus determining the position of the cut to the leading edge of the fabric, is controlled by the time delay circuit TD connected across the relay coil.

If the front cut is not desired as in some sewing operations, the switch S2 in the circuit for the capacitor C2 can be opened to the dash position, thus cutting the capacitor out of the circuit. Also, a switch S3 can be inserted in the relay circuit and operated by the lifter bar LB (FIG. 1) for the presser foot to prevent operation of the relay when the usual presser foot for the sewing machine is lifted.

It is preferred to have a switch SB1 mechanically connected to switch SA1 to control a circuit around the capacitor C1 when the switch SA1 is opened to bleed off any stored charge from the capacitor C1.

From the foregoing it will be seen that the preferred form of the invention provides a highly efficient automatic control for the cutting device which is responsive to the presence or absence of a fabric in the sewing position to perform a back and/or front cut, as may be required, in a highly efficient and effective manner whereby a rapid sewing operation can be performed.

Variations and modifications may be made within the scope of the claims and portion of the improvements may be used without others.

We claim:
1. A cutter for a sewing machine having a sewing needle for sewing a fabric disposed in a sewing position in said machine, comprising a body having a passage therethrough, said body being adapted to be mounted on the sewing machine with the passage behind the needle and in a direct path of the chain of stitches formed by the needle, an elongate, flexible, resilient, flat cutting blade having a cutting edge at the forward end thereof, a guide channel formed in the body above the passage for supporting the cutting blade for reciprocation therein from a normally retracted position to a projected cutting position, said guide having the forward portion thereof curving sharply downwardly and terminating at the upper side of said passage, said forward portion engaging and supporting the flat sides of the blade and bending the leading part of the blade downwardly when the blade is moved from retracted position to a projected cutting position, a fixed cutting blade on the body on the lower side of the passage and located to cooperate with said reciprocating blade in projected cutting position to sever the chain disposed in said passage, and means for reciprocating said flat blade.

2. The invention as defined in claim 1 wherein the flexible blade has broad upper and lower flat surfaces and the forward portion of the guide channel is provided with rollers mounted therein to engage the broad flat surfaces and assist the guide channel in bending the blade incident to the movement of the blade into cutting position.

3. The invention as defined in claim 1 wherein the means for reciprocating the blade comprises a rack gear connected to the blade, a spur gear engaging the rack to drive the same, and means for rotating the spur gear in opposite directions to reciprocate the rack.

4. The invention as defined in claim 3 wherein the connection between the rack gear and blade is a readily releasable connection whereby the blade can be easily removed for sharpening or replacement.

5. The invention as defined in claim 1 wherein the fixed cutting blade has a curved cutting edge and the reciprocating blade has its cutting edge ground at an angle to the longitudinal axis thereof with the resiliency of the reciprocating blade maintaining the cutting edge thereof in pressure engagement with said cutting edge of the fixed blade to provide a point contact having a shearing action in all cutting positions of said blades.

6. The invention as defined in claim 1 wherein there is provided positioning means for causing the chain formed at the sewing position to be disposed in said passage to be severed by the cutting blades.

7. The invention as defined in claim 6 wherein said positioning means comprises an air stream means and means for directing the air stream therefrom into said passage.

8. The invention as defined in claim 7 wherein control means is provided including means disposed in the air stream means for varying the air pressure in the air stream, said means being responsive to the presence of the fabric in the sewing position.

9. The invention as defined in claim 1 wherein the last means comprises an oscillating shaft, a power means for oscillating said shaft, and means for controlling said power means when a cut is required.

10. The invention as defined in claim 1 wherein the last means includes power means comprising a solenoid connected to reciprocate said blade, a capacitor in circuit therewith, means for charging the capacitor, and means including a control switch for discharging said capacitor to provide an operating pulse to said solenoid in response to a change of condition with respect to the location of a fabric in sewing position.

11. The invention as defined in claim 1 wherein the last means comprises a fluid pressure-responsive means, and a sensing means actuated by the fabric for varying the pressure in the fluid pressure-responsive means.

12. The invention as defined in claim 9 wherein the control means includes a switch and a manual actuator for said switch.

13. The invention as defined in claim 10 wherein the control means includes a switch, and an automatic actuator for said switch comprising means responsive to detection of the presence or absence of a fabric in said sewing position.

References Cited

UNITED STATES PATENTS

| 1,547,567 | 7/1925 | Dye | 112—252 |
| 2,262,294 | 11/1941 | Merrifield | 112—252 |
| 2,712,805 | 7/1955 | Peterson et al. | 112—252 |
| 3,058,438 | 10/1962 | Russell et al. | 112—252 |
| 3,230,916 | 1/1966 | Chezaud et al. | 112—252 X |
| 3,052,469 | 9/1962 | Dale | 112—2 X |

HERBERT F. ROSS, *Primary Examiner.*